United States Patent
Furuya

(10) Patent No.: US 10,671,731 B2
(45) Date of Patent: Jun. 2, 2020

(54) METHOD, APPARATUS, AND MEDIUM FOR USING A STORED PRE-BOOT AUTHENTICATION PASSWORD TO SKIP A PRE-BOOT AUTHENTICATION STEP

(71) Applicant: TOSHIBA CLIENT SOLUTIONS CO., LTD., Koto-ku, Tokyo (JP)

(72) Inventor: Taisuke Furuya, Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 233 days.

(21) Appl. No.: 15/389,329

(22) Filed: Dec. 22, 2016

(65) Prior Publication Data

US 2017/0185782 A1    Jun. 29, 2017

(30) Foreign Application Priority Data

Dec. 25, 2015 (JP) .................................. 2015-253926

(51) Int. Cl.
| | |
|---|---|
| G06F 21/57 | (2013.01) |
| G06F 21/32 | (2013.01) |
| G06F 9/4401 | (2018.01) |
| G06F 21/31 | (2013.01) |
| G06F 11/14 | (2006.01) |

(52) U.S. Cl.
CPC .......... G06F 21/575 (2013.01); G06F 21/32 (2013.01); *G06F 9/4406* (2013.01); *G06F 11/1417* (2013.01); *G06F 21/31* (2013.01)

(58) Field of Classification Search
CPC ........ G06F 21/32; G06F 21/31; G06F 21/575; G06F 9/4406; G06F 11/1417
USPC ...................................... 713/2; 726/2, 18, 19
See application file for complete search history.

(56) References Cited

U.S. PATENT DOCUMENTS

| 5,485,622 | A | * | 1/1996 | Yamaki ................... G06F 21/31 710/200 |
|---|---|---|---|---|
| 7,797,547 | B2 | | 9/2010 | Matsuoka et al. |
| 8,387,134 | B2 | * | 2/2013 | Matsuoka ............... G06F 21/31 713/183 |
| 2003/0070102 | A1 | | 4/2003 | Kondo |
| 2007/0050640 | A1 | | 3/2007 | Matsuoka |
| 2010/0169640 | A1 | * | 7/2010 | Smith .................... G06F 21/335 713/155 |
| 2013/0055382 | A1 | * | 2/2013 | Bhattiprolu ............. G06F 21/78 726/19 |
| 2017/0076088 | A1 | * | 3/2017 | Joshi ..................... G06F 21/572 |

FOREIGN PATENT DOCUMENTS

WO    WO 2002-05073    1/2002

* cited by examiner

*Primary Examiner* — Ji H Bae
(74) *Attorney, Agent, or Firm* — Rutan & Tucker, LLP

(57) ABSTRACT

According to one embodiment, an electronic apparatus includes a hardware processor. The hardware processor executes first authentication processing and second authentication processing when the electronic apparatus is powered on or rebooted. The hardware processor executes the first authentication processing using first data stored in the nonvolatile storage region after executing the second authentication processing in a case of executing the second authentication processing when the electronic apparatus is powered on or rebooted. The hardware processor deletes the first data from the nonvolatile storage region when setting of not executing the second authentication processing upon the electronic apparatus is powered on or rebooted is made.

12 Claims, 8 Drawing Sheets

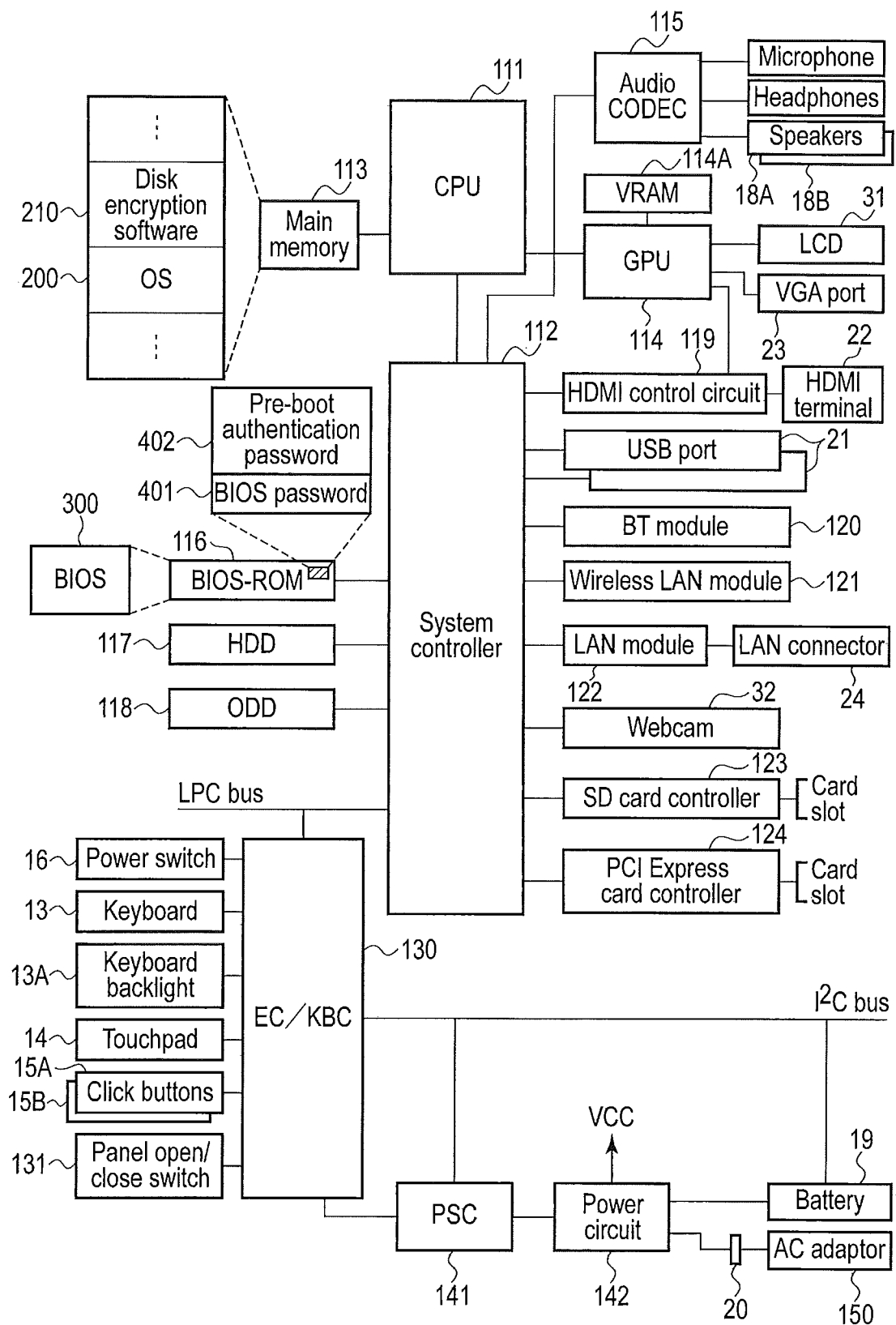
F I G. 2

METHOD, APPARATUS, AND MEDIUM FOR USING A STORED PRE-BOOT AUTHENTICATION PASSWORD TO SKIP A PRE-BOOT AUTHENTICATION STEP

CROSS-REFERENCE TO RELATED APPLICATIONS

This application is based upon and claims the benefit of priority from Japanese Patent Application No. 2015-253926, filed Dec. 25, 2015, the entire contents of which are incorporated herein by reference.

FIELD

Embodiments described herein relate generally to an electronic apparatus, a method and a storage medium.

BACKGROUND

In recent years, various electronic apparatuses such as notebook computers and tablet computers are widely used. These electronic apparatuses comprise mass storage such as a hard disk drive (HDD) and a solid-state drive (SSD) as an external storage device. To protect data stored in the mass storage from unauthorized access, some users use software to encrypt the data in the storage device, more specifically, the data written to the storage device. This software is called disk encryption software or the like. The disk encryption software can also encrypt data written to an externally-connected storage device such as a Universal Serial Bus (USB) flash drive.

Most disk encryption software includes instructions for a pre-boot authentication (PBA) function. The PBA function is a function of performing user authentication before an operating system (OS) is loaded, for example, when an electronic apparatus is powered on. A basic input/output system (BIOS) provided in an electronic apparatus also includes instructions for a user authentication function. Therefore, some encryption software PBA functions have user authentication process omission settings so that the users do not have to go through repetitious authentication processes such as password input processes. When the user makes the setting, the disk encryption software PBA function stores a user password in a predetermined safe region in advance and performs user authentication by using the password stored in the predetermined region without prompting the user to input the password.

BIOS user authentication functions also have settings which allow the users to omit user authentication processes such as password input processes. For example, in the user authentication process using a password, a state where no password is set corresponds to a state where the user authentication process omission setting is made by the user.

However, if the user performs the user authentication process omission setting for the BIOS user authentication function as well as the user authentication process omission setting for the encryption software PBA function, and if, for example, the electronic apparatus is stolen, the operation of the electronic apparatus proceeds up to the loading of the OS without assigning the user a single authentication process once the electronic apparatus is powered on.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram showing a system configuration of the electronic apparatus of the embodiment.

DETAILED DESCRIPTION

Various embodiments will be described hereinafter with reference to the accompanying drawings.

In general, according to one embodiment, an electronic apparatus includes a nonvolatile memory and a hardware processor. The hardware processor is in communication with the nonvolatile memory. The hardware processor is configured to execute first authentication processing using first data when the electronic apparatus is powered on or rebooted, execute second authentication processing before executing the first authentication processing, when the electronic apparatus is powered on or rebooted, and save the first data in a nonvolatile storage region of the nonvolatile memory. The hardware processor is configured to execute the first authentication processing using the first data stored in the nonvolatile storage region after executing the second authentication processing in a case of executing the second authentication processing when the electronic apparatus is powered on or rebooted, and delete the first data from the nonvolatile storage region when setting of not executing the second authentication processing upon the electronic apparatus is powered on or rebooted is made.

Figure 1:
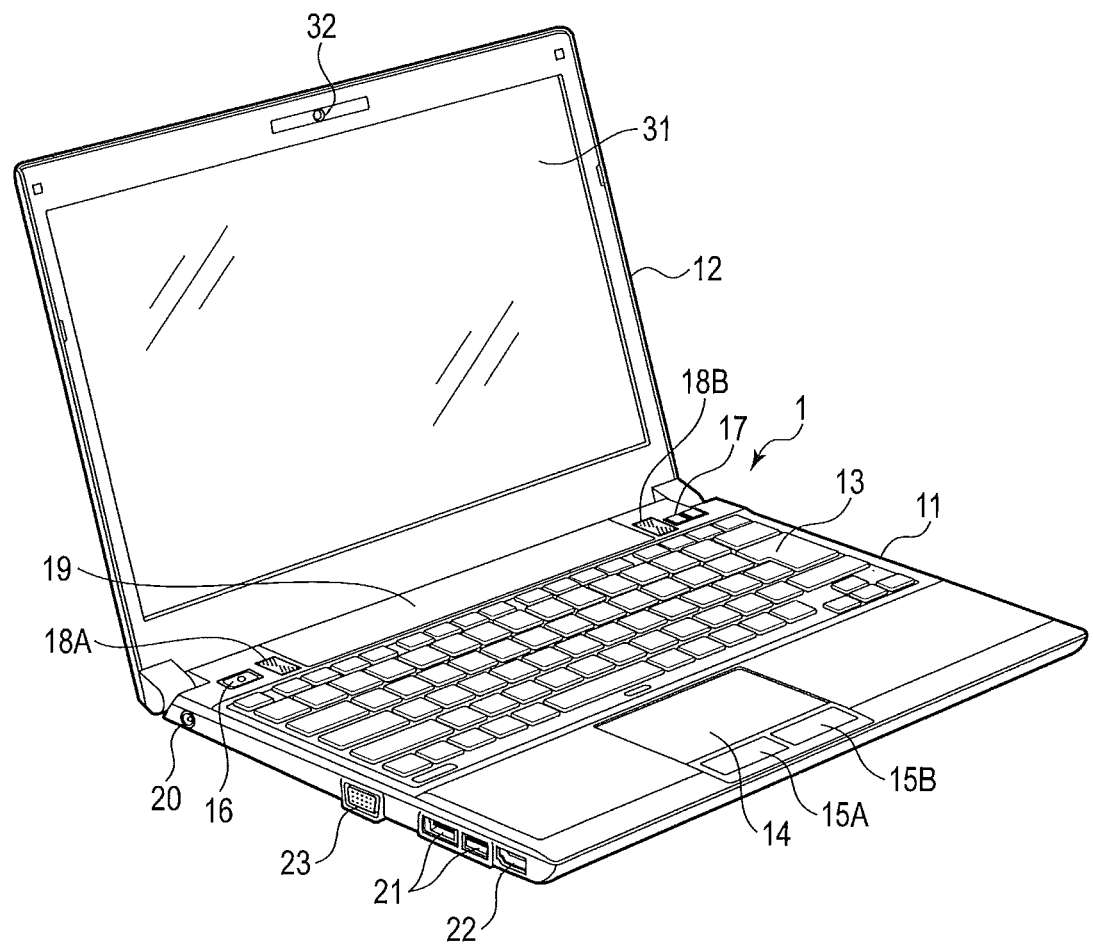
FIG. 1 is an exemplary diagram showing an external appearance of an electronic apparatus of an embodiment.

First, the structure of an electronic apparatus 1 of an embodiment will be described with reference to FIG. 1. As shown in FIG. 1, the electronic apparatus 1 may be realized as a notebook computer or the like.

FIG. 1 is a front perspective view of the electronic apparatus 1 in a state where a display unit is opened. The electronic apparatus 1 is powered by a battery 19. The electronic apparatus 1 comprises a body 11 and the display unit 12. A display device such as an LCD 31 is incorporated into the display unit 12. Further, a camera (webcam) 32 is provided at the upper end of the display unit 12.

The display unit 12 is rotatably attached to the body 11 between an open position in which the upper surface of the body 11 is exposed and a closed position in which the upper surface of the body 11 is covered with the display unit 12. The body 11 comprises a thin, box-shaped housing, and on the upper surface thereof, a keyboard 13, a touchpad 14, click buttons 15A and 15B, a power switch 16 configured to power on/off the electronic apparatus 1, several function buttons 17 and speakers 18A and 18B are provided.

Further, the body 11 is provided with a power connector 20. The power connector 20 is provided on a side surface, for example, the left side surface of the body 11. An external power device is detachably connected to the power connector 20. The external power device may be an AC adapter. An AC adapter is a power device which converts commercial power (AC power) to DC power.

The battery 19 is detachably provided, for example, at the back end of the body 11. The battery 19 may be a battery incorporated in the electronic apparatus 1.

The electronic apparatus 1 is driven by the power from an external power device or the battery 19. When the power connector 20 of the electronic apparatus 1 is connected to an external power device, the electronic apparatus 1 is driven by the power from the external power device. Further, the power from the external power device is also used for charging the battery 19. When the power connector 20 of the electronic apparatus 1 is not connected to an external power device, the electronic apparatus 1 is driven by the power from the battery 19.

Further, the body 11 comprises several USB ports 21, a High-definition Multimedia Interface (HDMI) (registered trademark) output terminal 22, a video graphics array (VGA) port (RGB port) 23, and a local area network (LAN) connector 24 (not shown).

FIG. 2 shows a system configuration of the electronic apparatus 1. The electronic apparatus 1 comprises a central processing unit (CPU) 111, a system controller 112, a main memory 113, a graphics processing unit (GPU) 114, an audio codec 115, a read-only memory (ROM) BIOS 116, an HDD 117, an optical disc drive 118, an HDMI (registered trademark) control circuit 119, a BT module (Bluetooth [registered trademark] module) 120, a wireless LAN module 121, a LAN module 112, a Secure Digital (SD) card controller 123, a Peripheral Component Interconnect (PCI) Express card controller 124, an embedded controller (EC)/keyboard controller (KBC) 130, a keyboard backlight 13A, a panel open/close switch 131, a power-supply controller (PSC) 141, a power circuit 142, and the like.

The CPU 111 is a processor which controls the operations of various components of the electronic apparatus 1. The CPU 111 executes various kinds of software (programs) loaded from the HDD 117 into the main memory 113. The software includes an OS 200 and disk encryption software 210, which will be described later. The disk encryption software 210 is a resident program incorporated in the electronic apparatus 1.

Further, the CPU 111 executes a BIOS 300 stored in the nonvolatile memory, namely, the BIOS-ROM 116. The BIOS 300 is a system program executed for hardware control. In the BIOS-ROM 116, storage regions are secured respectively for a BIOS password 401 and a pre-boot authentication password 402, which will be described later.

The GPU 114 is a display controller which controls the LCD 31 incorporated in the display unit 12. The GPU 114 generates a display signal (LVDS signal) to be supplied to the LCD 31 from display data stored in a video random access memory (VRAM) 114A. The GPU 114 can also generate an analog RGB signal and an HDMI (registered trademark) video signal from the display data. The analog RGB signal is supplied to an external display device via the VGA port 23. The HDMI (registered trademark) output terminal 22 can output an HDMI (registered trademark) video signal (uncompressed digital video signal) and a digital audio signal to an external display device via a single cable. The HDMI (registered trademark) control circuit 119 is an interface for outputting the HDMI (registered trademark) video signal and the digital audio signal to an external display device via the HDMI (registered trademark) output terminal 22.

The system controller 112 is a bridge device which connects the CPU 111 and various components. The system controller 112 comprises a built-in Serial ATA (SATA) controller which controls the HDD 117 and the ODD 118. Further, the system controller 112 executes communication with various devices on a Low Pin Count (LPC) bus.

The EC/KBC 130 is connected to the LPC bus. The EC/KBC 130, the PCS 141 and the battery 19 are mutually connected to each other via a serial bus such as an I2C bus.

The EC/KBC 130 is a power management controller which executes power management of the electronic apparatus 1 and is realized, for example, as a single-chip microcomputer comprising a built-in keyboard controller configured to control the keyboard 13, the touchpad 14 and the click buttons 15A and 15B. The EC/KBC 130 has a function of powering on/off the electronic apparatus 1 according to the user's operation on the power switch 16. The EC/KBC 130 cooperates with the PSC 140 to execute the function of powering on/off the electronic apparatus 1. On receiving a power-on signal transmitted from the EC/KBC 130, the PSC 141 controls the power circuit 142 to power on the electronic apparatus 1. Further, on receiving a power-off signal transmitted from the EC/KBC 130, the PSC 141 controls the power circuit 142 to power off the electronic apparatus 1. The EC/KBC 130, the PSC 141 and the power circuit 142 are powered by the battery 19 or an AC adapter 150 even when the electronic apparatus 1 is powered off.

Further, the EC/KBC 130 can power on/off the keyboard backlight 13A provided at the back of the keyboard 13. Still further, the EC/KBC 130 is connected to the panel open/close switch 131 configured to detect opening and closing of the display unit 12. The EC/KBC 130 can also power on the electronic apparatus 1 on detecting by use of the panel open/close switch 131 that the display unit 12 is opened.

The power circuit 142 generates power (operation power) to be supplied to various components by using the power from the battery 19 or the AC adapter 150 connected to the body 11 as an external power device.

The disk encryption software 210 operating as a resident program on the electronic apparatus 1 having the above-described structure is a program for preventing unauthorized access of data, for example, stored in the HDD 117 or in a flash drive connected to a USB port 21. The disk encryption software 210 includes instructions for encrypting and decrypting data transmitted thorough a data communication channel when write to the HDD 117 or the flash drive or when read from the HDD 117 or the flash drive. That is, the disk encryption software 210 is a program for encrypting data in a storage device such as the HDD 117 or the flash drive.

The disk encryption software 210 includes instructions for the PBA function of performing user authentication before the OS 200 is loaded. When the disk encryption software 210 is installed in the electronic apparatus 1, the master boot record of a boot disk (here, the HDD 117) is updated by the installer, and when the OS 200 is normally loaded into the main memory 113, a module (a pre-boot authentication module 211, which will be described later) responsible for the PBA function of the disk encryption software 210 is loaded into the main memory 113. If the user authentication of the PBA function succeeds, the OS 200 is then loaded into the main memory 133. In the user authentication of the PBA function, for example, a password is used. The password is hereinafter referred to as a pre-boot authentication password 402. Modules other than the module responsible for the PBA function of the disk encryption software 210 operate under the control of the OS 200 after the OS 200 is loaded.

The BIOS 300 executed when the electronic apparatus 1 is powered on also includes instructions for a user authentication function. Also in the user authentication of the BIOS 300, for example, a password is used. The password is hereafter referred to as a BIOS password 401. That is, when the user powers on the electronic apparatus 1 installing the disk encryption software 210 therein, basically, the user is first prompted to input the BIOS password 401 by the BIOS 300, and if the user inputs the BIOS password 401 correctly, the user is then prompted to input the pre-boot authentication password 402 by the disk encryption software 210.

Figure 3:
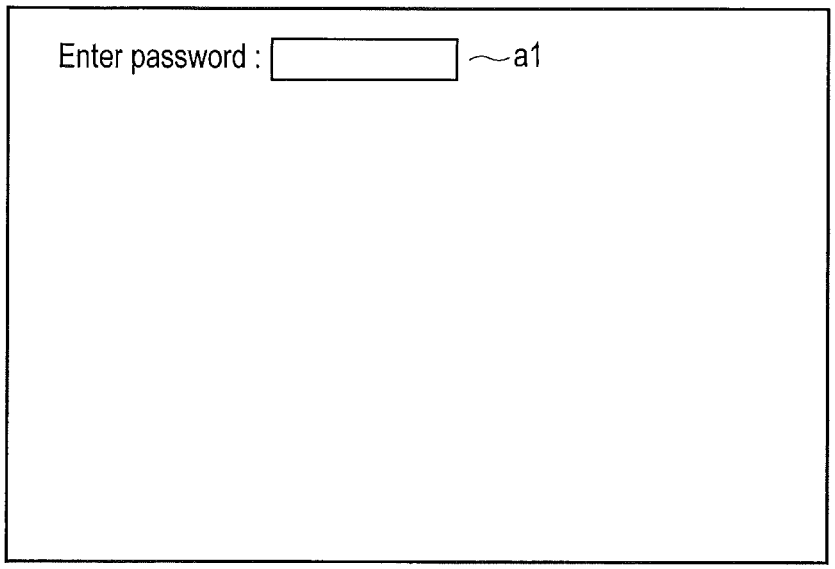
FIG. 3 is an exemplary diagram showing an exemplary password input screen displayed by a BIOS which operates on the electronic apparatus of the embodiment.
Figure 4:
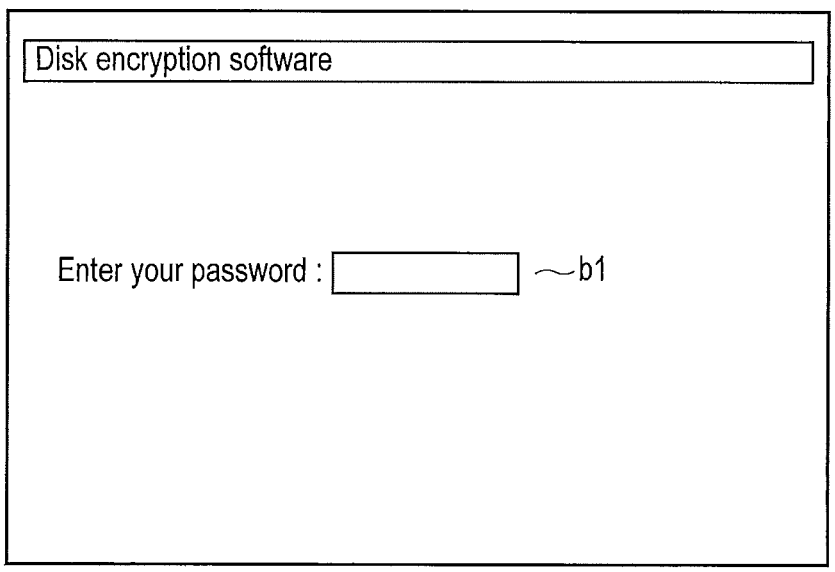
FIG. 4 is an exemplary diagram showing an exemplary password input screen displayed by disk encryption software which operates on the electronic apparatus of the embodiment.

FIG. 3 is an exemplary diagram showing an exemplary input screen of the BIOS password 401 displayed by the BIOS 300. As shown in FIG. 3, the BIOS 300 includes instructions for displaying an input screen including an input area (a1) for the BIOS password 401. Further, FIG. 4 is an exemplary diagram showing an exemplary input screen for the pre-boot authentication password 402 displayed by the disk encryption software 210. As shown in FIG. 4, the disk encryption software 210 includes instructions for displaying an input screen including an input area (b1) for the pre-boot authentication password 402. If the user inputs passwords in these areas correctly, the user can load the OS 200. Note that input prompts for a user name and a password to be made from the OS 200 after the OS 200 is loaded are not considered here.

In the meantime, if an authentication process such as a password input process is repeatedly assigned to the user, the user may find the electronic apparatus 1 inconvenient to use. Therefore, the PBA function of the disk encryption software 210 has a mechanism to improve the usability such as a setting to omit the input of the pre-boot authentication password 402. The setting is hereinafter referred to as a pre-boot authentication skip setting. Further, if the user has not set the BIOS password 401, the user will not be prompted to input the BIOS password 401 either. That is, the user authentication of the BIOS 300 will be omitted.

Therefore, if the user has not set the BIOS password 401 and made the pre-boot authentication skip setting, the operation of the electronic apparatus 1 proceeds up to the loading of the OS 200 without assigning the user a single password input process. It is necessary to take some measures to prevent such a situation, for example, in consideration of a case where the electronic apparatus 1 is stolen. In the electronic apparatus 1, the BIOS 300 and the disk encryption software 210 cooperate to prevent such a situation. This mechanism will be described below.

First, with reference to FIG. 5, FIG. 6 and FIG. 7, exemplary procedure of how the pre-boot authentication skip setting is accepted by the disk encryption software 210 will be described. Note that screens shown in FIG. 5, FIG. 6 and FIG. 7 are displayed by the disk encryption software 210 operating under the control of the OS 200.

Figure 5:
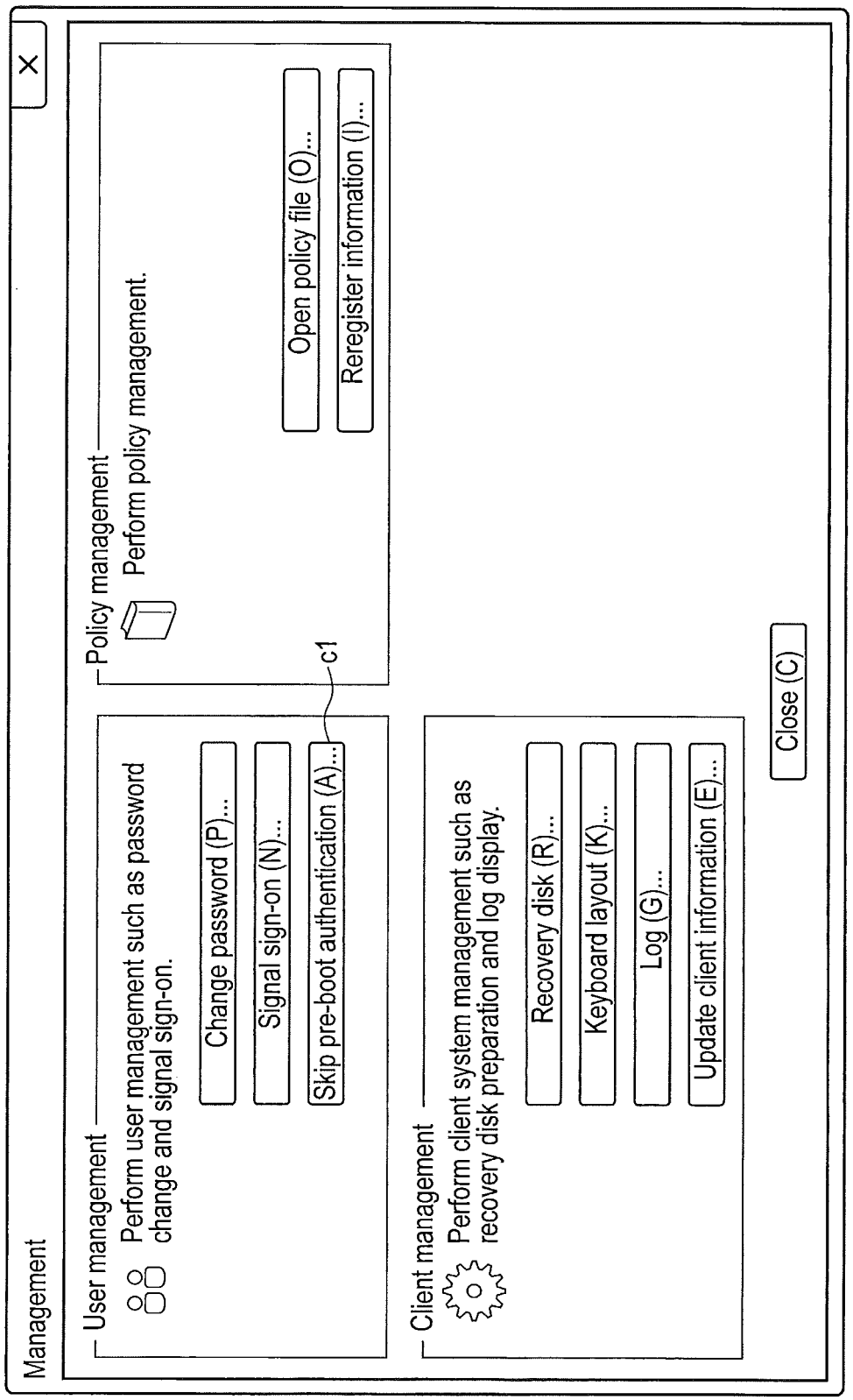
FIG. 5 is an exemplary diagram showing an exemplary setting screen displayed by the disk encryption software which operates on the electronic apparatus of the embodiment.

The disk encryption software 210 includes instructions for displaying a setting screen to make various settings including the pre-boot authentication skip setting, for example, such as that shown in FIG. 5. As shown in FIG. 5, a button (c1) for the pre-boot authentication skip setting is provided on the setting screen. The disk encryption software 210 includes instructions for displaying a confirmation screen asking the user to confirm that the user wishes to make the pre-boot authentication skip setting when the button is operated, for example, such as that shown in FIG. 6.

Figure 6:
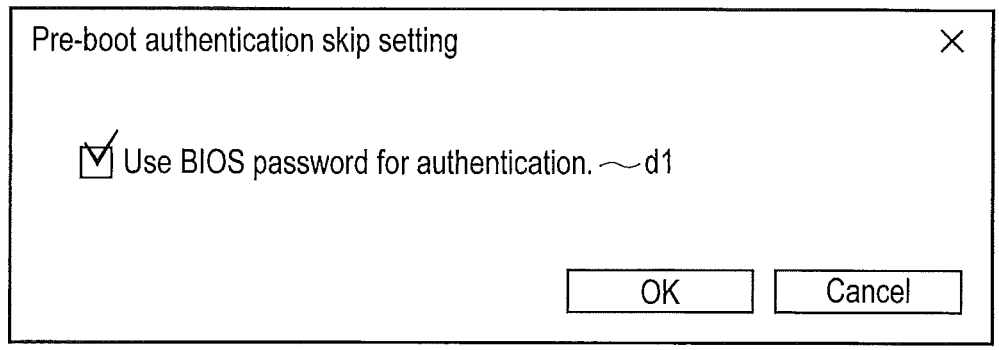
FIG. 6 is an exemplary diagram showing an exemplary confirmation screen displayed by the disk encryption software which operates on the electronic apparatus of the embodiment.

As shown in FIG. 6, the confirmation screen includes an input area (d1) to instruct that an authentication process to be assigned to the user will only be the input of the BIOS password 401. That is, the confirmation screen shows that the user needs to set the BIOS password 401 to make the pre-boot authentication skip setting. Note that the notification in FIG. 6, "Use BIOS password for authentication," simply means that it is possible to perform the user authentication of the disk encryption software 210 based on the BIOS password 401 input in response to the prompt from the BIOS 300, but does not mean that the BIOS password 401 is actually used in the user authentication of the disk encryption software 210.

Figure 7:
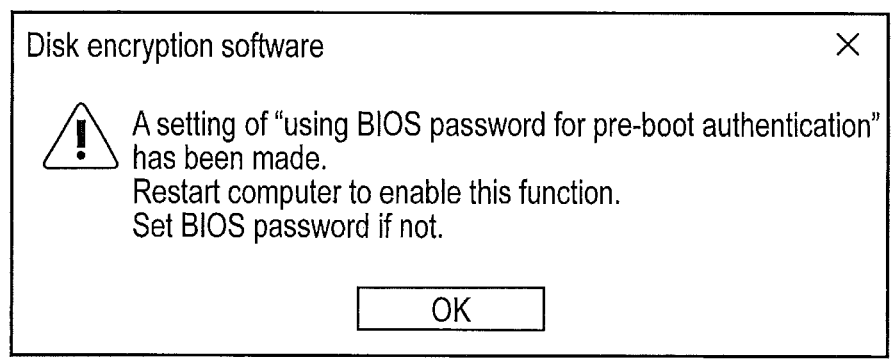
FIG. 7 is an exemplary diagram showing an exemplary message screen displayed by the disk encryption software which operates on the electronic apparatus of the embodiment.

The disk encryption software 210 includes instructions for displaying a message screen such as that shown in FIG. 7 and for recording that the user has made the pre-boot authentication skip setting, for example, as setting data, when the user operates on the confirmation screen to confirm the user's intention. At this moment, the pre-boot authentication skip setting is not enabled yet. Here, the BIOS password 401 is assumed to have already been set to the BIOS 300. The BIOS password 401 is saved by the BIOS-ROM 116. The pre-boot authentication password 402 is managed independently by the disk encryption software 210.

When the electronic apparatus 1 is powered on for the first time or rebooted after the pre-boot authentication skip setting is made, as described above, the input screen for the BIOS password 401 such as that of FIG. 3 is displayed by the BIOS 300, and then the input screen for the pre-boot authentication password 402 such as that of FIG. 4 is displayed by the disk encryption software 210. The disk encryption software 210 includes instructions for enabling the pre-boot authentication skip setting when there is a record of the pre-boot authentication skip setting and if the pre-boot authentication password 402 is input correctly. That is, after that, displaying the input screen or prompting the user to input the pre-boot authentication password 402 will not be performed, when the electronic apparatus 1 is powered on or rebooted.

Next, exemplary cooperation between the BIOS 300 and the disk encryption software 210 will be described with reference to FIG. 8.

Figure 8:
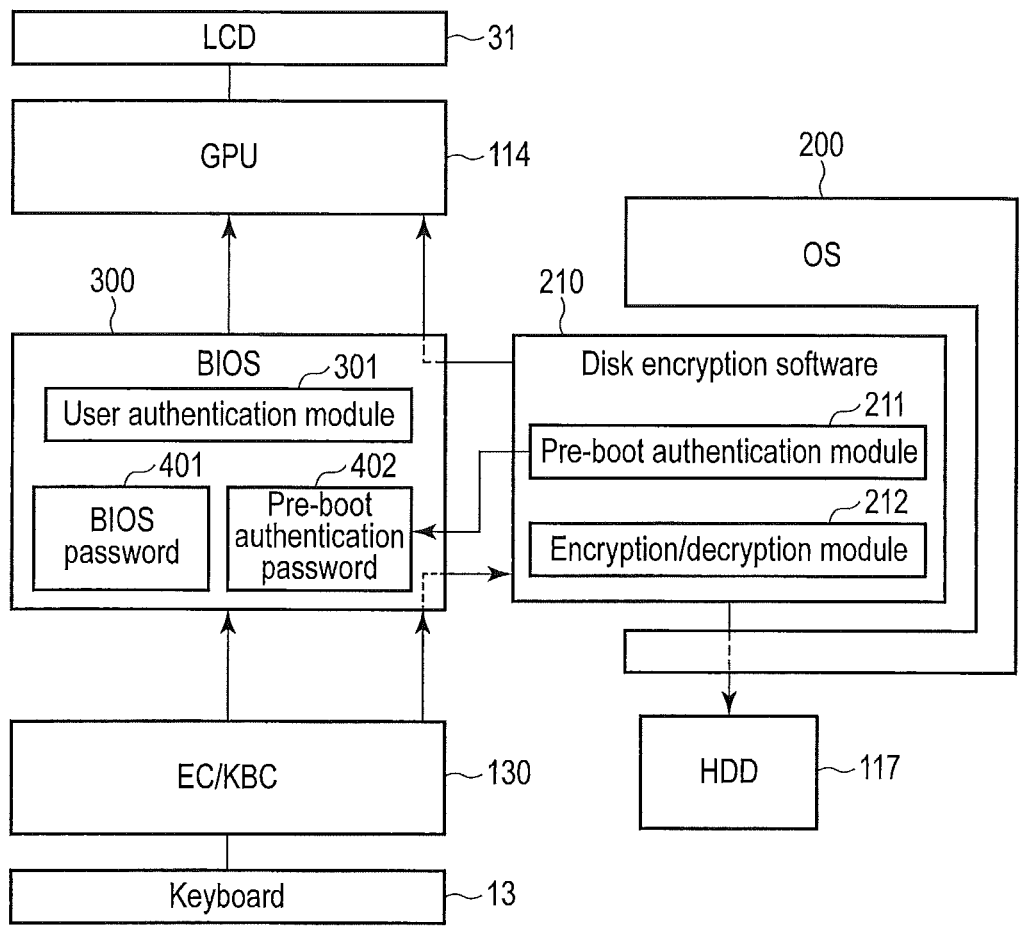
FIG. 8 is an exemplary functional block diagram of user authentication of the electronic apparatus of the embodiment.

As shown in FIG. 8, the BIOS 300 comprises a user authentication module 301. The user authentication module 301 is a module for executing the user authentication using the BIOS password 401. The user authentication module 301 includes instructions for displaying the input screen of the BIOS password on the LCD 31 via the GPU 114 and determines whether the input password obtained from the keyboard 13 via the EC/KBC 130 is correct or not.

Further, the disk encryption software 210 comprises the pre-boot authentication module 211 and an encryption/decryption module 212. The pre-boot authentication module 211 is a module for executing the user authentication using the pre-boot authentication password 402, that is, the module responsible for the PBA function of the disk encryption software 210. The pre-boot authentication module 211 includes instructions for displaying the input screen for the pre-boot authentication password 402 on the LCD 31 via the BIOS 300 and for determining whether the input password obtained from the keyboard 13 via the BIOS 300 is correct or not. The encryption/decryption module 212 is a module for executing, for example, encryption of data written to the HDD 117 or decryption of data read from the HDD 177.

The pre-boot authentication module 211 includes instructions for requesting the BIOS 300 to save the pre-boot authentication password 402 in the case of enabling the pre-boot authentication skip setting by following the above-described procedure. The user authentication module 301 includes instructions for saving the pre-boot authentication password 402 received from the disk encryption software 210 in the BIOS-ROM 116 when the request is received by the BIOS 300. In the following description, the process of requesting the BIOS 300 to save the pre-boot authentication password 402 may also be referred to as a process of saving the pre-boot authentication password 402 in the BIOS 300.

Further, the pre-boot authentication module 211 includes instructions for requesting the BIOS 300 to read the pre-boot authentication password 402 in the user authentication if the pre-boot authentication skip setting has been made. The user authentication module 301 includes instructions for returning the pre-boot authentication password 402 saved by the BIOS-ROM 116 to the pre-boot authentication module 211 when the request is received by the BIOS 300. The pre-boot authentication module 211 includes instructions for determining whether the password obtained from the BIOS 300 coincides with the pre-boot authentication password 402 under its own management. The pre-boot authentication module 211 includes instructions for concluding the user authentication without displaying the input screen for the pre-boot authentication password 402, that is, without prompting the user to input the password, if the passwords coincide with each other. Further, the pre-boot authentication module 211 includes instructions for displaying the input screen for the pre-boot authentication password 402 and for prompting the user to input the password, if the password does not coincide. Then, if the input password coincides with the pre-boot authentication password 402 under its own management, the user authentication is concluded.

Here, the case of canceling the BIOS password 401 will be considered. In the case of canceling the BIOS password 401, a state where the BIOS password 401 is set to the electronic apparatus 1 changes to a state where the BIOS password is not set to the electronic apparatus 1. The case of canceling the BIOS password 401 includes the case of deleting the BIOS password 401.

The BIOS 300 includes instructions for deleting the pre-boot authentication password 402 saved by the BIOS-ROM 116 when the BIOS password 401 is canceled. The BIOS 300 may include instructions for deleting the pre-boot authentication password 402 only if the pre-boot authentication password 402 is stored, or may include instructions for initializing the storage region in the BIOS-ROM 116 secured for the pre-boot authentication password 402 regardless of whether the pre-boot authentication password 402 is stored or not.

Then, when the electronic apparatus 1 is powered on or rebooted, the BIOS 300 is first executed, but since the BIOS password 401 is not set to the electronic apparatus 1, the user will not be prompted to input the BIOS password 401. Therefore, the operation of the electronic apparatus 1 proceeds up to the user authentication process of the disk encryption software 210 (the pre-boot authentication module 211) without the input of the BIOS password 401.

Here, the pre-boot authentication skip setting is assumed to have been made, as described above. The pre-boot authentication module 211 includes instructions for requesting the BIOS 300 to read the pre-boot authentication password 402, as described above. However, the pre-boot authentication password 402 in the BIOS-ROM 116 has been deleted. For response to the request, the BIOS 300 (the user authentication module 301) may include instructions for making an error response or merely return data having a length of zero bytes to the pre-boot authentication module 211. The pre-boot authentication module 211, includes instructions for displaying the input screen for the pre-boot authentication password 402 and prompts the user to input the password if failing to obtain the pre-boot authentication password 402 from the BIOS 300. Then, if the input password coincides with the pre-boot authentication password 402 under its own management, the user authentication is concluded.

Figure 9:
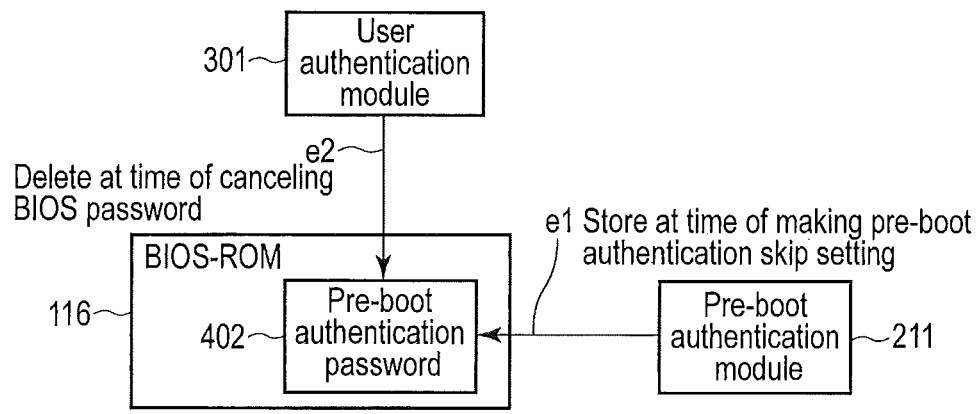
FIG. 9 is an exemplary diagram showing an exemplary block diagram showing cooperation between the BIOS which operates on the electronic apparatus of the embodiment and the disk encryption software.

That is, in the user authentication, the BIOS 300 (the user authentication module 301) and the disk encryption software 210 (the pre-boot authentication module 211) cooperate with each other as shown in FIG. 9. More specifically, the pre-boot authentication module 211 includes instructions for requesting the BIOS 300 to save the pre-boot authentication password 402 when the pre-boot authentication skip setting is made. In other words, the pre-boot authentication module 211 includes instructions for saving the pre-boot authentication password 402 in the BIOS 300 (e1 of FIG. 9). The pre-boot authentication module 211 includes instructions for performing the user authentication using the pre-boot authentication password 402 saved in the BIOS 300.

Further, the user authentication module 301 includes instructions for deleting the pre-boot authentication password 402 saved in the BIOS 300 when the BIOS password 401 has been canceled (e2 of FIG. 9). In this way, the pre-boot authentication password 402 cannot be obtained from the BIOS 300 any longer. The pre-boot authentication module 211 includes instructions for prompting the user to input the password and for executing the user authentication by using the input password. That is, one of the user authentication of the BIOS 300 (the user authentication module 301) and the user authentication of the disk encryption software 210 (the pre-boot authentication module 211) is always performed in the electronic apparatus 1.

In this way, the BIOS 300 (the user authentication module 301) and the disk encryption software 210 (pre-boot authentication module 211) cooperate with each other to maintain the mechanism of preventing an authentication process such as a password input process from being assigned to the user twice while preventing the operation of the electronic apparatus 1 from proceeding up to the loading of the OS 200 without assigning a single authentication process such as a password input process to the user.

Figure 10:
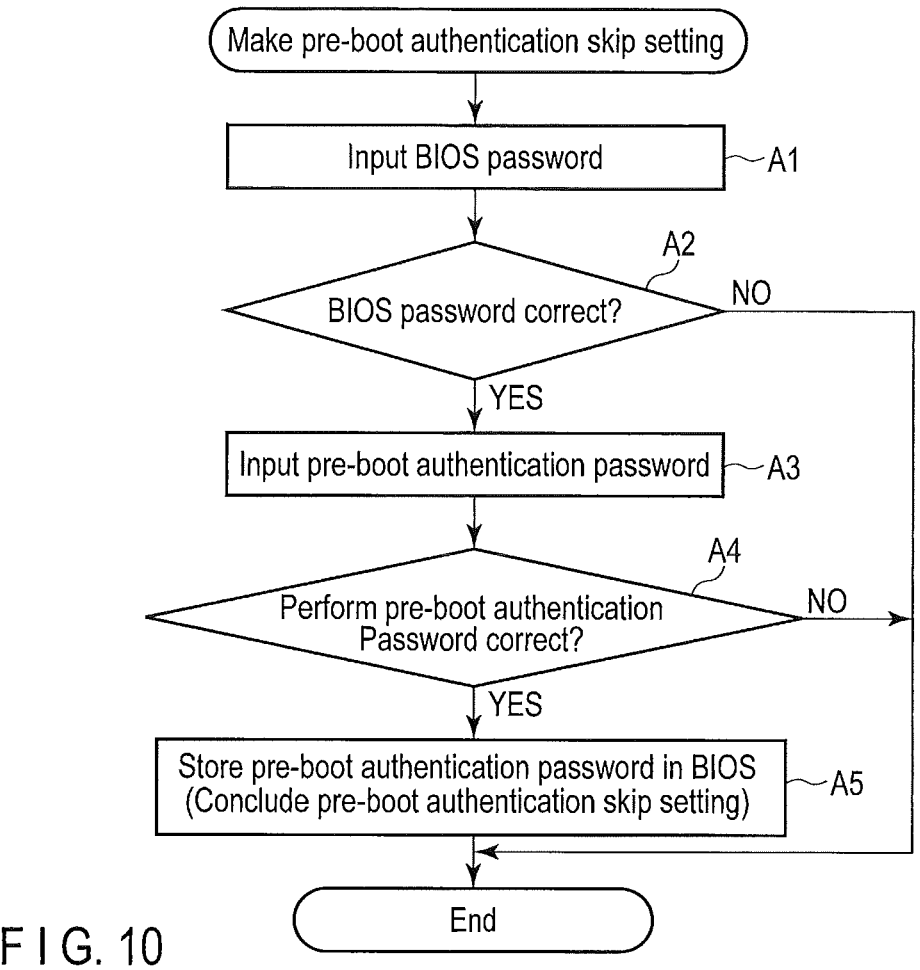
FIG. 10 is an exemplary flowchart showing operation procedure in a pre-boot authentication skip setting of the electronic apparatus of the embodiment.

FIG. 10 is an exemplary flowchart showing operation procedure of the electronic apparatus 1 in a case where the pre-boot authentication skip setting has been made.

First, the user is prompted to input the BIOS password 401 (block A1). If the BIOS password 401 is input correctly (yes in block A2), user authentication is concluded.

When the user authentication is concluded, the user is prompted to input the pre-boot authentication password 402 (block A3). If the pre-boot authentication password 402 is input correctly (yes in block A4), user authentication for the pre-boot authentication skip setting is concluded. When the user authentication for the pre-boot authentication skip setting is concluded, that is, when the BIOS password 401 and the pre-boot authentication password 402 are input correctly, the pre-boot authentication password 402 is saved by the BIOS 300 (block A5).

Figure 11:
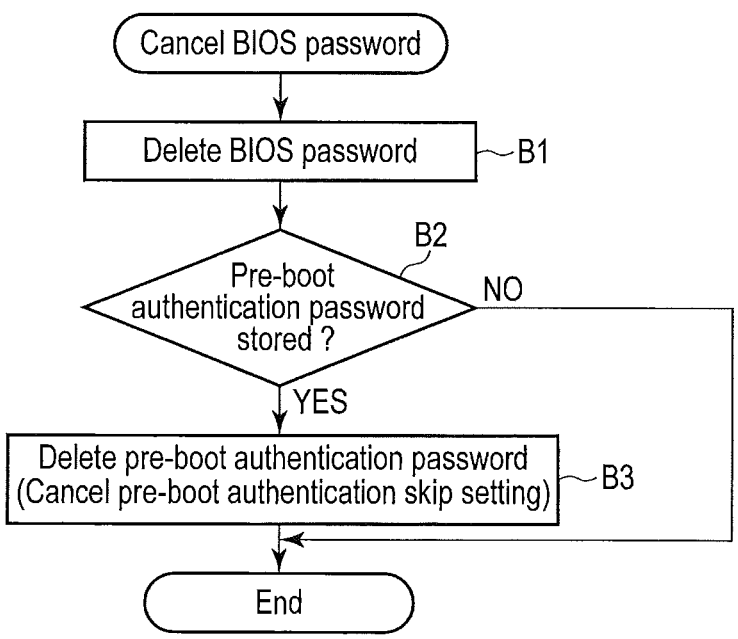
FIG. 11 is an exemplary flowchart showing operation procedure in BIOS password cancellation of the electronic apparatus of the embodiment.

FIG. 11 is an exemplary flowchart showing operation procedure of the electronic apparatus 1 in a case where the BIOS password has been canceled.

First, the BIOS password 401 stored in the BIOS-ROM 116 is deleted (block B1). If the pre-boot authentication password 402 is saved by the BIOS 300 (yes in block B2), the pre-boot authentication password 402 saved by the BIOS 300 is deleted (block B3). As described above, the cancellation of the pre-boot authentication password 402 is substantially equivalent to the cancellation of the pre-boot authentication skip setting.

Figure 12:
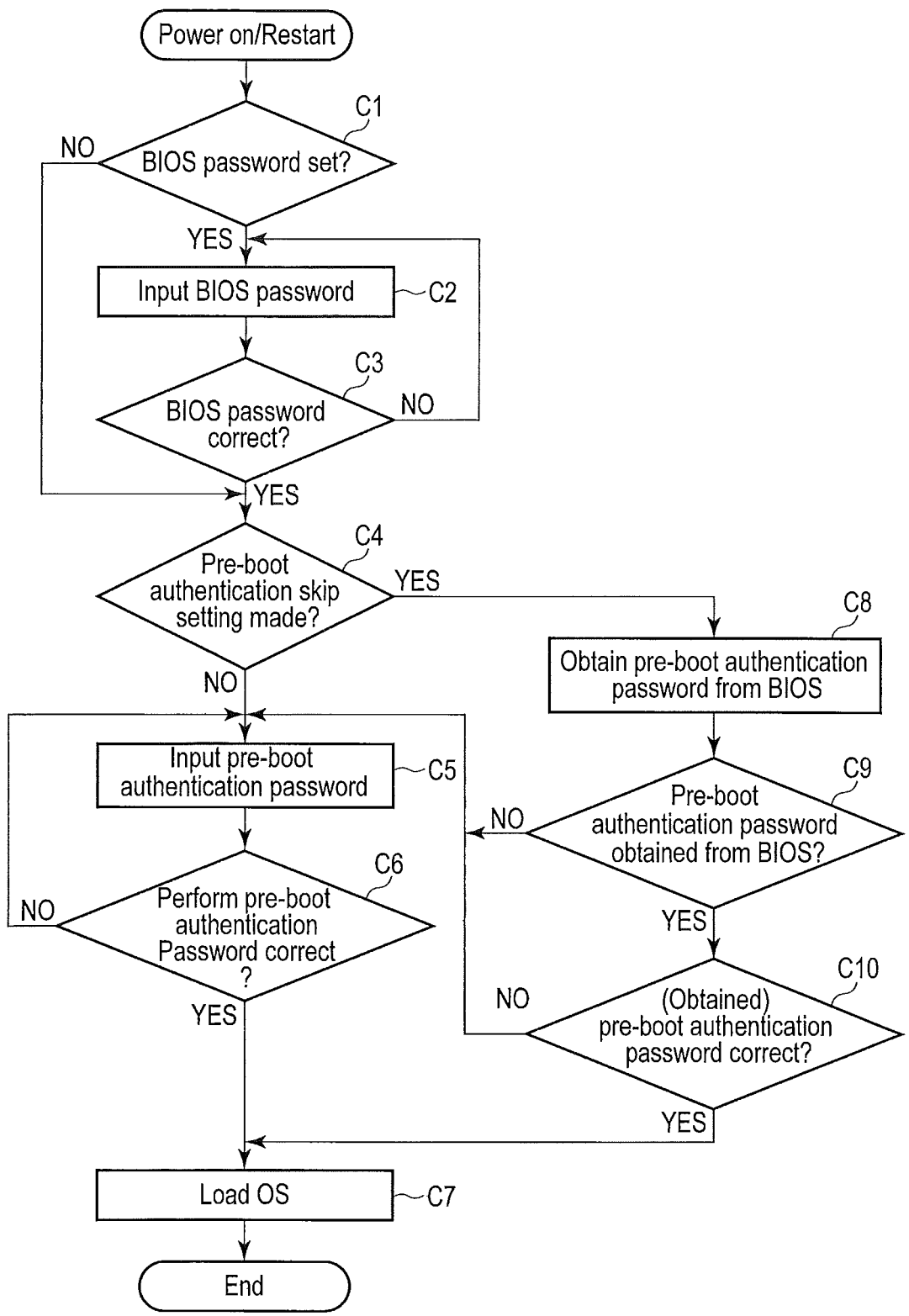
FIG. 12 is an exemplary flowchart showing operation procedure in power-on or reboot of the electronic apparatus of the embodiment.

FIG. 12 is an exemplary flowchart showing operation procedure for powering on or rebooting the electronic apparatus 1.

First, if the BIOS password 401 has been set (yes in block C1), the user is prompted to input the BIOS password 401 (block C2). The user authentication will not be performed if the BIOS password 401 has not been set (no in block C1). If the BIOS password 401 is input correctly (yes in block C3), the user authentication is concluded. If the input password does not coincide with the BIOS password 401 (no in block C3), the user is prompted to input the BIOS password 401 again (block C2).

If the BIOS password 401 has not been set or the user authentication of the user authentication module 301 has been concluded and if the pre-boot authentication skip setting has not been made (no in block C4), the user is prompted to input the pre-boot authentication password 402 (block C5). If the pre-boot authentication password 402 is input correctly (yes in block C6), pre-boot authentication is concluded, and the OS 200 is loaded (block C7). If the input password does not coincide with the pre-boot authentication password 402 (no in block C6), the user is prompted to input the pre-boot authentication password 402 again (block C5).

On the other hand, if the pre-boot authentication skip setting has been made (yes in block C4), the pre-boot authentication password 402 is obtained from the BIOS 300 (block C8). If the pre-boot authentication password 402 is obtained from the BIOS 300 (yes in block C9), whether the pre-boot authentication password 402 is correct or not is determined (block C10). If the pre-boot authentication password 402 is correct (yes in block C10), the pre-boot authentication is concluded, and the OS 200 is loaded (block C7). If the pre-boot authentication password 402 cannot be obtained from the BIOS 300 (no in block C9) or if the pre-boot authentication password 402 obtained from the BIOS 300 is incorrect (no in block C10), the user is prompted to input the pre-boot authentication password 401 again (block C5). If the pre-boot authentication password 402 is then input correctly (yes in block C6), the pre-boot authentication is concluded, and the OS 200 is loaded (block C7). If the input password does not coincide with the pre-boot authentication password 402 (no in block C6), the user is prompted to input the pre-boot authentication password 402 again (block C5).

As described above, according to the electronic apparatus 1 of the embodiment, it is possible to ensure the convenience of omitting some of a plurality of authentication processes while appropriately assigning at least one authentication process to the user.

Note that, in the present embodiment, the user authentication of the BIOS 300 (the user authentication module 301) using the BIOS password 401 and the user authentication of the disk encryption software 210 (the pre-boot authentication module 211) using the pre-boot authentication password 402, that is, user authentications using passwords have been described. However, the present embodiment of appropriately assigning authentication processes to the user in the above-described procedure is effective not only in performing the user authentications using passwords but also in performing one or both of the user authentications using biometric data such as finger prints and retinas as long as both of the user authentications have skip settings.

The various functions described in the present embodiment may also be realized by a processing circuit. The processing circuit includes a programmed processor such as a central processing unit (CPU). The processor executes the functions by executing programs stored in a memory. The processor may also be a microprocessor including an electric circuit. The processing circuit also includes a digital signal processor (DSP), an application specific integrated circuit (ASIC), a microcontroller, a controller and any other electric circuit component.

Since the processing of the present embodiment can be implemented by the computer program, advantages similar to the advantages of the present embodiment can easily be obtained by installing the computer program in a computer via a computer-readable storage medium in which the computer program is stored and by merely executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a processor;
   a first memory communicatively coupled to the processor, the first memory stores (i) a Basic Input/Output System (BIOS) including a user authentication module to execute a first user authentication using a BIOS password input on a password input screen;
   a second memory communicatively coupled to the processor, the second memory stores a disk encryption module that operates under control of an operating system (OS), the disk encryption module includes a pre-boot authentication module and an encryption/decryption module, wherein the pre-boot authentication module to execute a second user authentication using pre-boot authentication password input on the password input screen and the encryption/decryption module to conduct an encryption of data and a decryption of encrypted data; and a third memory communicatively coupled to the processor, the third memory stores the BIOS password provided by the BIOS and the pre-boot authentication password being stored by the pre-boot authentication module when enabling a pre-boot authentication skip setting, wherein:

the pre-boot authentication module, during execution by the processor, requests the BIOS to read out the pre-boot authentication password stored in the third memory when the pre-boot authentication skip setting is made;

the BIOS, during execution by the processor, returns the pre-boot authentication password that has been read out to the pre-boot authentication module; and the pre-boot authentication module, during execution by the processor, concludes the second user authentication without displaying the password input screen when the pre-boot authentication password received from the BIOS and the pre-boot authentication password managed by the pre-boot authentication module coincide with each other.

2. The electronic apparatus of claim 1, wherein the disk encryption module, during execution by the processor, displays the password input screen for the second user authentication to request a user to input the pre-boot authentication password when the pre-boot authentication password is not stored in the memory.

3. The electronic apparatus of claim 1, wherein the disk encryption module, during execution by the processor, displays the password input screen for the second user authentication to request a user to input the pre-boot authentication password when the pre-boot authentication password received from the BIOS and the pre-boot authentication password managed by the disk encryption module do not coincide with each other.

4. The electronic apparatus of claim 1, wherein:

the BIOS, during execution by the processor, deletes the BIOS password and the pre-boot authentication password in the memory when the first user authentication is canceled; and the disk encryption module, during execution by the processor, displays the password input screen for the second user authentication to request a user to input the pre-boot authentication password when the electronic apparatus is powered on.

5. The electronic apparatus of claim 1, wherein both the first memory and the third memory form a single memory.

6. The electronic apparatus of claim 1, wherein both the first memory and the third memory are a BIOS-ROM.

7. A method executed by an electronic apparatus including a processor and one or more memories storing (i) a Basic Input/Output System (BIOS) including a user authentication module that, during execution by the processor, conducts a first user authentication using a BIOS password input on a password input screen, (ii) a disk encryption module, operating under control of an operating system (OS), including (a) a pre-boot authentication module configured, when executed by the processor, to conduct a second user authentication using a pre-boot authentication password input on the password input screen and (b) an encryption/decryption module configured, when executed by the processor, to conduct an encryption of data and a decryption of the encrypted data, and (iii) one or more passwords including the BIOS password and the pre-boot authentication password, the method comprising:

requesting, by the pre-boot authentication module executed by the processor, the BIOS to read out the pre-boot authentication password stored in the one or more memories when the pre-boot authentication skip setting is made;

returning, by the BIOS executed by the processor, the pre-boot authentication password that has been read out to the pre-boot authentication module; and concluding, by the pre-boot authentication module executed by the processor, the second user authentication without displaying the password input screen when the pre-boot authentication password received from the BIOS and the pre-boot authentication password managed by the pre-boot authentication module coincide with each other.

8. The method of claim 7, further comprising displaying, by the disk encryption module executed by the processor, the password input screen for the second user authentication to request a user to input the pre-boot authentication password when the pre-boot authentication password received from the BIOS and the pre-boot authentication password managed by the disk encryption module do not coincide with each other.

9. The method of claim 7, further comprising:

deleting, by the BIOS executed by the processor, the BIOS password and the pre-boot authentication password in the one or more memories when the first user authentication is canceled; and displaying, by the disk encryption module executed by the processor, the password input screen for the second user authentication to request a user to input the pre-boot authentication password when the electronic apparatus is powered on.

10. A non-transitory computer-readable storage medium having stored thereon a computer program which is executable by a computer, the computer includes one or more memories to store (i) a Basic Input/Output System (BIOS) including a user authentication module, when executed, conducting a first user authentication using a BIOS password input on a password input screen, (ii) a disk encryption module including a pre-boot authentication module that, when executed, conducting a second user authentication a using pre-boot authentication password input on the password input screen and an encryption/decryption module that, when executed, conducting an encryption of data and decryption of the encrypted data, the computer program controlling the computer to perform operations comprising:

requesting, by the pre-boot authentication module during execution, the BIOS to read out the pre-boot authentication password stored in the memory when the pre-boot authentication skip setting is made;

returning, by the BIOS during execution, the pre-boot authentication password that has been read out to the pre-boot authentication module; and concluding, by the pre-boot authentication module during execution, the second user authentication without displaying the password input screen when the pre-boot authentication password received from the BIOS and the pre-boot authentication password managed by the pre-boot authentication module coincide with each other.

11. The non-transitory computer-readable storage medium of claim 10, wherein the computer program further controls the computer to perform operations comprising displaying, during execution of the disk encryption module, the password input screen for the second user authentication to request a user to input the pre-boot authentication password when the pre-boot authentication password received from the BIOS and the pre-boot authentication password managed by the disk encryption module do not coincide with each other.

12. The non-transitory computer-readable storage medium of claim 10, wherein the computer program further controls the computer to perform operations comprising:
   deleting, by the BIOS during execution, the BIOS password and the pre-boot authentication password in the memory when the first user authentication is canceled; and
   displaying, by the disk encryption module during execution, the password input screen for the second user authentication to request a user to input the pre-boot authentication password when the electronic apparatus is powered on.

\* \* \* \* \*